United States Patent [19]

Bier

[11] 4,341,334
[45] Jul. 27, 1982

[54] APPARATUS FOR SPACING SHEETS AND MOVING GROUPS OF SPACED SHEETS

[75] Inventor: David A. Bier, Houston, Pa.

[73] Assignee: PPG Industries, Inc., Pittsburgh, Pa.

[21] Appl. No.: 157,741

[22] Filed: Jun. 9, 1980

Related U.S. Application Data

[62] Division of Ser. No. 968,335, Dec. 11, 1978, abandoned.

[51] Int. Cl.³ .................. B26F 3/00; B65H 35/04; B65H 35/10
[52] U.S. Cl. .................... 225/96.5; 225/103; 198/425; 198/575; 198/577; 271/203; 271/270; 83/26; 83/27; 83/110
[58] Field of Search .............. 225/4, 5, 96.5, 103; 271/202, 203, 266, 270; 198/425, 459, 460, 461, 577, 575, 781, 783, 789; 83/26, 27, 88, 89, 110, 156; 53/443, 531, 543

[56] References Cited

U.S. PATENT DOCUMENTS

| | | | |
|---|---|---|---|
| 1,848,114 | 3/1932 | Drake | 198/461 |
| 2,073,082 | 3/1937 | Walter | 83/110 |
| 2,701,049 | 2/1955 | Kendall et al. | 198/577 |
| 3,108,677 | 10/1963 | Temple | 198/575 |
| 3,846,958 | 11/1974 | Divan | 83/89 |
| 3,910,141 | 10/1975 | Divan | 83/26 |
| 3,931,879 | 1/1976 | Javerzat et al. | 198/425 |
| 4,083,277 | 4/1978 | Lotz | 83/110 |
| 4,109,783 | 8/1978 | Vogt | 198/789 |
| 4,155,495 | 5/1979 | Cathers | 225/96.5 |

Primary Examiner—Frank T. Yost
Assistant Examiner—K. Bradford Adolphson
Attorney, Agent, or Firm—Donald C. Lepiane

[57] ABSTRACT

A conveyor section advances a ribbon into a cutting station where sheets are severed from the glass ribbon. The sheets are advanced onto downstream conveyor rolls where the sheet is accelerated for a given period of time to space the trailing edge of the sheet from the leading edge of the ribbon, i.e., leading edge of the next sheet to be severed from the ribbon. When a predetermined number of spaced sheets are on the conveyor rolls, the conveyor rolls are accelerated to a speed greater than the ribbon conveying speed and spacing speed to move the group of sheets downstream along the conveyor section into additional working stations.

11 Claims, 3 Drawing Figures

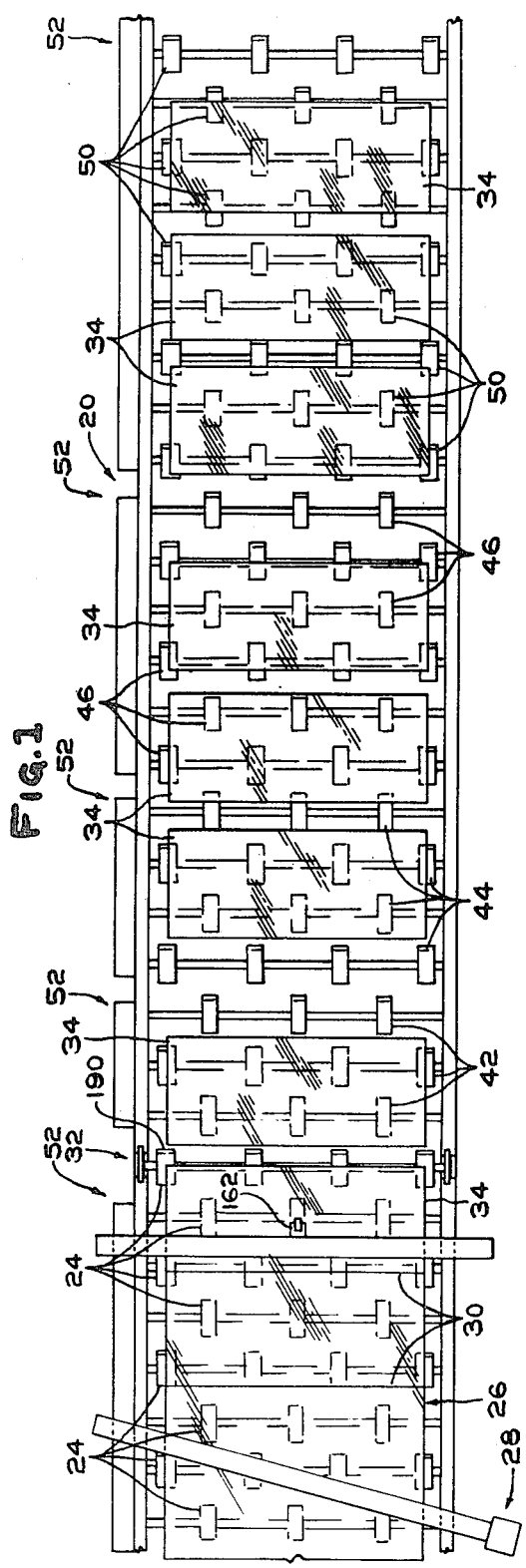
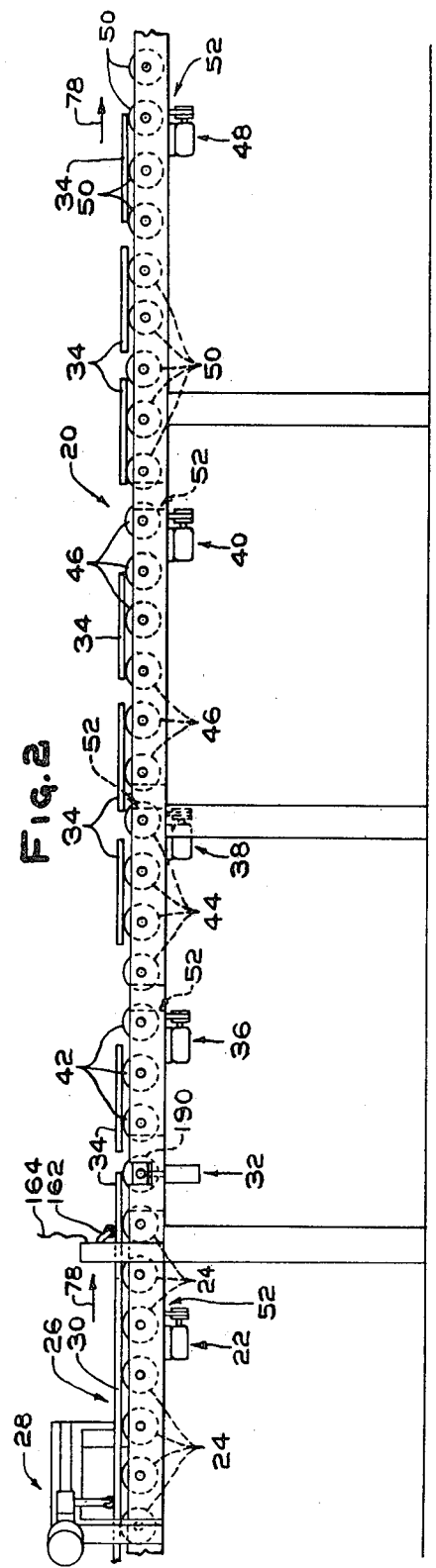

APPARATUS FOR SPACING SHEETS AND MOVING GROUPS OF SPACED SHEETS

This is a division of application Ser. No. 968,335, filed Dec. 11, 1978, now abandoned.

BACKGROUND OF THE INVENTION

1. Field of the Invention

This invention relates to an apparatus for spacing sheets and moving groups of spaced sheets.

2. Discussion of the Prior Art

In general, glass sheets are severed from a moving glass ribbon by moving the ribbon through a severing station and thereafter accelerating the severed sheet to prevent the trailing edge of the severed sheet from contacting the leading edge of the ribbon, i.e., the leading edge of the next sheet to be severed. The severed sheets are thereafter moved into work stations, e.g., packaging stations or additional severing stations. The prior art conveyors are capable of accelerating one or more sheets provided that the length is less than the length of the smallest conveyor section. This is because the motor arrangement that drives the conveyor sections is only capable of powering the conveyor sections at two speeds. One speed is the ribbon speed and the other speed is the separation speed. If the length of one sheet or the combined length of two or more spaced sheets overlays two conveying sections, one end of the upstream conveyor section is receiving the ribbon while the other end is discharging the sheets. Since the conveyor section is driven at one speed, the speed is too fast for receiving the ribbon or too slow for discharging the sheets.

It would be advantageous, therefore, to provide a conveying system that has no limitation as to the number of spaced sheets that can be conveyed while maintaining a uniform spacing therebetween.

SUMMARY OF THE INVENTION

This invention relates to an apparatus for spacing articles e.g., sheets severed from a glass ribbon and moving groups of a predetermined number of spaced sheets. Successive severed sheets are moved onto a first conveyor section at ribbon speed. When the individual sheets move onto the first conveyor section, the sheets are accelerated to (1) provide a space between the last sheet to move onto the first conveyor section and the next sheet moving onto the first conveyor section and (2) maintain the spaced distance between sheets already on the conveyor section. After a group of a predetermined number of sheets are on the conveyor section and prior to the next sheet moving onto the conveyor section, the group of sheets are accelerated to a speed greater than the ribbon speed and the separation speed to move the group from the first conveyor section onto a second conveyor section while maintaining the spaced distance therebetween.

BRIEF DESCRIPTION OF THE DRAWING

FIG. 1 is a plan view of a conveyor section incorporating features of the invention for spacing sheets as they are severed and moving groups of spaced severed sheets;

FIG. 2 is a side view of the conveyor section shown in FIG. 1; and

DESCRIPTION OF THE INVENTION

Figure 3:
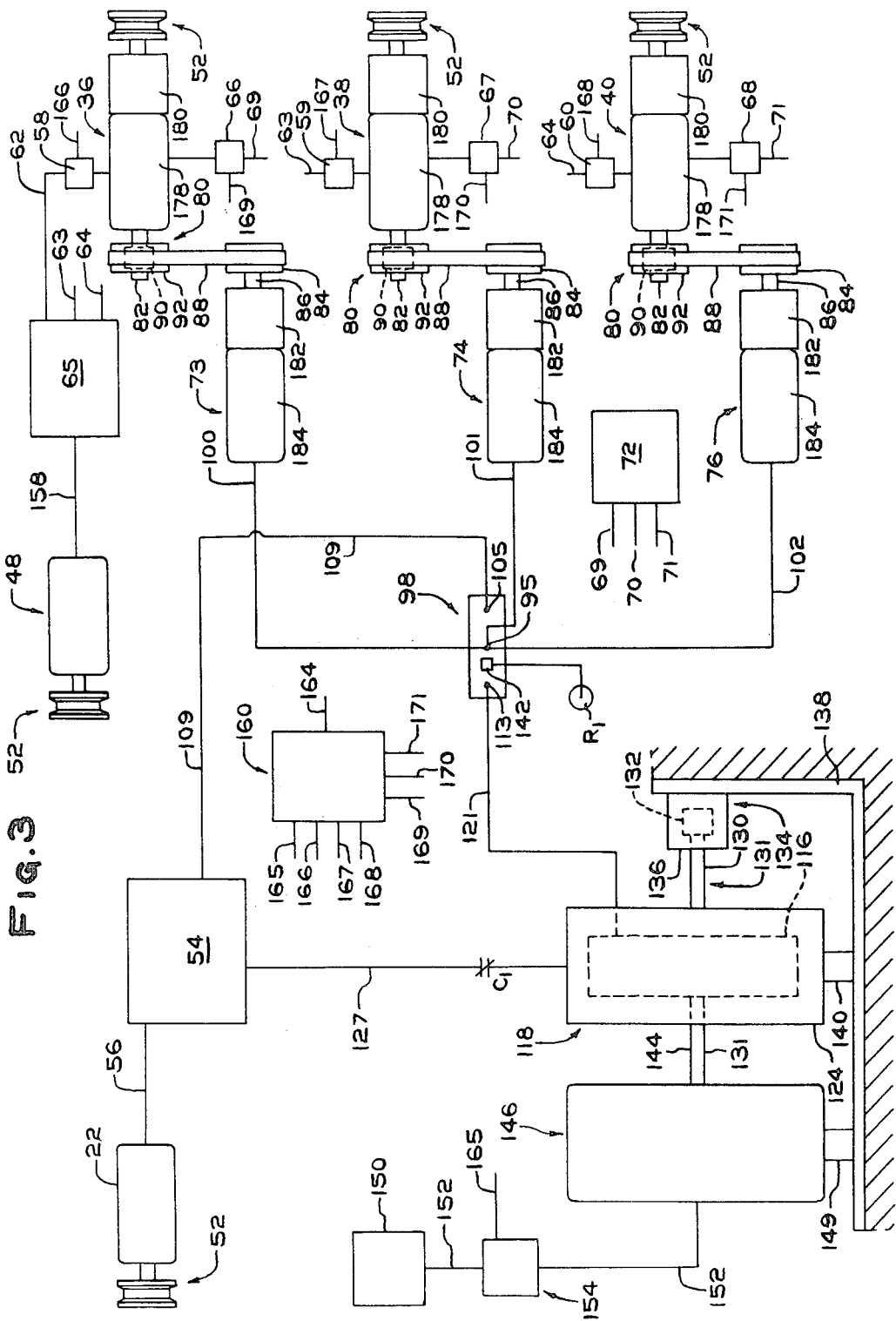
FIG. 3 is a schematic illustrating a preferred arrangement of power supplies and motors for driving the conveyor rolls of the conveyor section shown in FIGS. 1 and 2 in accordance to the teachings of the invention.

In the following discussion like numerals refer to like elements. In FIGS. 1 and 2, there is shown conveyor section 20 having (1) conveyor drive motor 22 for driving conveyor rolls 24 to move glass ribbon 26 through lateral scoring apparatus 28 where lateral scores 30 are sequentially imposed in the glass ribbon 26 and through severing station 32 where the scores 30 are sequentially opened to sever glass sheets 34 from the ribbon; (2) conveyor drive motors 36, 38 and 40 for driving conveyor rolls 42, 44 and 46, respectively, to separate glass sheets 34 from one another and for moving groups of a predetermined number of spaced glass sheets; and (3) conveyor drive motor 48 for driving conveyor rolls 50 to advance groups of spaced sheets into work stations (not shown). The conveyor drive motors 22, 36, 38, 40 and 48 drive their respective conveyor rolls 24, 42, 44, 46 and 50 in any conventional manner, e.g., through pulley belt and gear arrangement 52.

In the following discussion the sheets 34 are glass sheets severed from the glass ribbon 26. The energizing of the scoring apparatus 28 and the severing station 32 is not limiting to the invention and may be accomplished in any convenient manner, e.g., as taught in U.S. Patent Application Ser. No. 927,083, filed on July 24, 1978, in the name of Daniel A. Plocik for "System for Actuating Glass Ribbon, Cross Scoring and Snapping and Snapping Equipment" now U.S. Pat. No. 4,238,064 which teachings are hereby incorporated by reference.

With reference to FIG. 3, the conveyor drive motor 22 is connected to power supply 54 by cable 56 to drive the glass ribbon 26 at a convenient speed e.g., a predetermined first speed or ribbon speed. The conveyor drive motors 36, 38 and 40 are (1) electrically connected through normally open switches 58, 59 and 60 and cables 62, 63 and 64, respectively to power supply 65; (2) electrically connected through normally open switches 66, 67 and 68 and cables 69, 70 and 71, respectively, to power supply 72; and (3) mechanically connected to drive motors 73, 74 and 76, respectively, in a manner to be discussed below. When the normally open switches 58, 59 and/or 60 are closed in a manner to be discussed, the conveyor drive motors 36, 38 and/or 40 respectively, drive their respective conveyor rolls 42, 44 and 46 to displace a group of spaced sheets in the direction of the arrow 78 (see FIG. 2) at a convenient sheet conveying speed e.g. a third predetermined speed preferably greater than the first predetermined speed or ribbon speed to sequentially discharge sheets from upstream conveyor rolls. In this manner, the upstream conveyor rolls are available for separating subsequently severed sheets. When the closed switches 58, 59 and/or 60 are sequentially opened and the normally open switches 66, 67 and/or 68 are sequentially closed, the power supply 72 applies a voltage to conveyor motors 36, 38 and 40 to decelerate the motors to drive their respective conveyor rolls 42, 44 and/or 46 at the speed at which they were driven prior to closing the switches 58, 59 and 60, e.g., the ribbon speed.

The conveyor drive motors 36, 38 and 40 are connected to their respective power motors 73, 74 and 76 by overriding clutch 80 mounted on shaft extension 82 of motors 36, 38 and 40 and pulley 84 mounted on shaft 86 of the drive motors 73, 74 and 76 with endless belt 88 connecting the clutch 80 and the pulley 84. The overriding clutch 80 has innerrace 90 mounted on the shaft extension 82 and endless belt 80 an outerrace 92. The clutch 80 allows the conveyor drive motors 36, 38 and 40 to be accelerated when connected to the power supply 65 and decelerated when connected to the power supply 72 even though the shaft 86 of the drive motor 73, 74 and 76 is rotating at a different speed, e.g., a slower speed. As can be appreciated the clutch 80 may be mounted on the shaft 86 of the power motors 73, 74 and 76 and pulley 84 may be mounted on the shaft extension 82 of the conveyor drive motors 36, 38 and 40.

The drive motors 72, 74 and 76 are electrically connected to center pole 95 of switch 98 by cables 100, 101, and 102, respectively. Pole 105 of the switch 98 is electrically connected to the power supply 54 by cable 109 and pole 113 of the switch 98 is electrically connected to rotor 116, of wound rotor motor 118 by cable 121.

Stator 124 of the wound rotor motor 118 is connected to the power supply 54 through normally open contact $C_1$ and cable 127. Shaft end 130 of the rotor shaft 131 is mounted in innerrace 132 of overriding clutch 134 with outerrace 136 mounted to stationery member 138. The stator 124 is mounted to the stationery member 138 by strut 140. With the above mechanical arrangement and the contact $C_1$ closed, the overriding clutch 134 prevents the rotor 116 from rotating in the direction of the magnetic field imposed by the stator 124 while permitting the rotor 116 to rotate in a direction opposite to the direction imposed by the magnetic field. When a magnetic field is imposed on the rotor and the rotor is prevented from rotating in the direction imposed by the field, the would rotor motor 118 acts as a transformer having about a 1 to 1 input to output voltage ratio. When the rotor 116 is rotated in a direction opposite to the direction of the imposed magnetic field the wound rotor motor 118 acts as a rotating transformer and results in a frequency and voltage boost having a greater output than input. Although not limiting to the invention, a wound rotor motor is preferred because mechanically rotating the rotor against the magnetic field results in an input to output ratio e.g., volts per Hertz that is relatively constant within a given shaft speed range.

The contact $C_1$ in cable 127 is not limiting to the invention but is recommended to make certain that the power supply 54 is not electrically connected to the wound rotor motor 118 when preventive maintenance or inspection of the motor 118 is being performed. The contact $C_1$ may be opened or closed by providing a relay switch 142 which is actuated when switch poles 113-95 are interconnected, i.e., the switch 98 is in the first energized position. When the relay switch 142 is energized, the relay $R_1$ is actuated to close contact $C_1$, when the switch 98 is in any position other than the first energized position, the relay switch 142 is deenergized and the contact $C_1$ is open.

End 144 of the rotor shaft 131 is connected to shaft driving motor 146 which rotates the rotor 116 to increase the voltage and frequency output of the rotor motor 118. The shaft driving motor 146 secured to the stationary member 138 by strut 149 is connected to power supply 150 by cable 152 and normally open switch 154. When the switch 154 closes, the motor 146 is energized and rotates the rotor 116. The voltage and frequency output of the rotor motor 118 increases which accelerates the power motors 73, 74 and 76 which in turn accelerates their respective conveyor driving motors, 36, 38 and 40 which accelerates their respective conveyor rolls 42, 44 and 46 to a convenient spacing speed e.g. a second predetermined speed to space severed sheets and move spaced sheets.

The conveyor drive motor 48 is connected to the power supply 65 by cable 158. The motor 48 drives its respective conveyor rolls 50 at the third predetermined speed for receiving groups of a predetermined number of spaced sheets from adjacent upstream rolls 46 and for moving the group downstream into work positions (not shown). The speed at which groups of spaced sheets are moved is preferably greater than the ribbon speed and the spacing speed in order that the group of spaced sheets is discharged from the conveyor rolls 42, 44 and/or 46 so that the new or next severed sheets can be separated by the conveyor rolls 42, 44 and/or 46 as was discussed.

The switches 58, 59 and 60 to connect the conveyor motors 36, 38 and 40, respectively, to the power supply 65; the switches 66, 67 and 68 to connect the conveyor motor 36, 38 and 40, respectively, to the power 72; and switch 154 to connect shaft driving motor 146 to power supply 150 may be closed and opened as required in any conventional manner. For example, but not limiting to the invention, a computer 160 receives a signal from linear monitoring 162 (see FIGS. 1 and 2) along cable 164 to monitor the movement of the glass ribbon. After a glass sheet is severed from the ribbon, the computer 160 forwards a signal along cable 165 to close switch 154 to connect the shaft driving motor 146 to the power supply 150. The shaft driving motor 146 rotates the rotor 116 which accelerates the conveyor rolls 42, 44 and 46 in the manner discussed above to accelerate the speed of the severed sheet to provide a space between the severed sheet and the leading edge of the ribbon, i.e., the leading edge of the next sheet to be severed from the ribbon. When the desired spacing has been attained, the computer 160 forwards a signal along line 165 to open the switch 154 and the conveyor rolls 42, 44 and 46 drop back to the ribbon speed for receiving the next severed sheet. The above is repeated for each severed sheet to provide a spacing between the severed sheets and to maintain the spacing between the spaced sheets.

When the trailing edge of the last severed sheet for making up a group of a predetermined number of spaced sheets is severed from the ribbon, the computer 160 forwards a signal along cables 166, 167 and 168 to close the normally open switches 58, 59 and 60 to connect the conveyor drive motors 36, 38 and 40 respectively to the power supply 65. The conveyor drive motors 36, 38 and 40 accelerate from the ribbon speed or velocity as determined by the drive motors 73, 74 and 76 to an exit or discharge velocity to match the speed or velocity of the conveyor rolls 50 driven by the conveyor motor 48. The group of spaced sheets are accelerated along the conveyor rolls 42, 44 and 46. When the trailing edge of the last sheet in the group leaves the conveyor rolls 42 a signal is forwarded by the computer 160 along the line 166 to open the closed switch 58 and along line 169 to close the open switch 66. When the switch 66 closes, the power supply 72 applies a voltage for a short period of time to decelerate the conveyor drive motor 36 to drive its respective rolls 42 at the ribbon speed to receive the leading edge of the ribbon, i.e., next sheet to be severed. A signal is thereafter forwarded along the line 169 to open the closed switch 66. When the trailing edge of the last sheet of the group of spaced sheets leaves the last downstream roll 44, the computer 160 forwards a signal along the line 167 to open closed switch 59 and along line 170 to close open switch 67 and thereafter open the switch 67 to decelerate the conveyor rolls 44 to the ribbon speed. The conveyor rolls 44 are ready for receiving the severed sheet from the rolls 42 or ready for spacing severed sheets in the manner discussed above. When the trailing edge of the last sheet of the group leaves the last downstream roll 46, the computer 160 forwards a signal along line 168 to open the closed switch 60 and along line 171 to close open switch 68 to decelerate the rolls 46 to the ribbon speed and thereafter along line 171 to open the closed switch 68. The drive motors 36, 38 and 40 now operate to move severed sheets and to space severed sheets in the manner discussed above.

When the switch 98 is in the second energized position, i.e., the poles 95 and 105 are interconnected and the contactor C-1 is open, the motors 73, 74 and 76 are connected to the power supply 54. With the switch 98 in the second energized position, preventive maintenance may be made to the rotor motor 118 while using the conveyor 20. For example, a sheet 34 severed from the ribbon may be accelerated downstream along the rolls 42, 44 and 46 onto the rolls 50 in a similar manner discussed above for moving groups of spaced sheets onto the rolls 50.

As can now be appreciated, the invention is not limited to glass sheets or severing sheets from a ribbon and may be practiced on metal, wooden or plastic sheets.

DETAILED DESCRIPTION OF THE INVENTION

The invention is practiced to provide a space of about one inch (2.54 centimeters) between glass sheets 34 and move groups of three spaced sheets. Each of the sheets have a width of about 40 inches (1 meter) as measured between the leading and trailing edge of the sheet as they advance along the conveyor 20 in the direction of the arrow 78.

With reference to FIGS. 1 and 2, the conveyor section 20 includes a plurality of conveyor donut rolls 24; three conveyor donut rolls 42; four conveyor donut rolls 44; six conveyor donut rolls 46 and a plurality of conveyor donut rolls 50. The conveyor rolls 24, 42, 44, 46 and 50 are on a center to center spacing of about 10 inches (25.4 centimeters). The rolls 24, 42, 44, 46 and 50 are driven by conveyor drive motors 22, 36, 38, 40 and 48, respectively, by pulley belt and gear arrangement 52. The conveyor drive motor 22 is a three phase synchronous motor and is connected to a sinusoidal-variable, frequency-variable, voltage power supply 54 by cable 56. The conveyor drive motor 22 drives the rolls 24 to convey a glass ribbon at a linear speed of about 600 inches (15 meters) per minute. The conveyor drive motor 48 is a three phase induction motor and is connected to a 460 Volt-60 Hertz power supply by cable 158. The conveyor drive motor 48 drives its respective rolls 50 to convey groups of three spaced sheets at a linear speed of about 2400 inches (60 meters) per minute.

With reference to FIG. 3, the conveyor drive motors 36, 38 and 40 are identical in construction and each include a three phase induction motor 178 and a 15 to 1 gear reducer 180. Each of the induction motors 178 have a shaft extension 82 having innerrace 90 of an overriding clutch 80 mounted thereon. Outerrace 92 of the clutch 80 of each conveyor motor 36, 38 and 40 is connected by endless belt to pulley 84 mounted on shaft 86 of a 5 to 1 gear reducer 182 of power drive motors 73, 74 and 76. Each of the power motors 73, 74 and 76 include a three phase synchronous motor 184 which drives its respective gear reducer 182. The gear reducer 182 of drive motors 73, 74 and 76 and gear reducer 180 of the drive motors 36, 38 and 40 adjust the rotational speed of their respective conveyor rolls 42, 44 and 46 to (1) match the speed of the conveyor rolls 26 when receiving the leading edge of the ribbon or severed glass sheets and (2) match the speed of the conveyor rolls 50 when moving groups of spaced sheets onto the conveyor rolls 50. As can be appreciated, the invention is not limited to the use of gear reducers 180 and 182 and gear reductions may be made directly to the conveyor gears.

The synchronous motors 184 of the drive motors 73, 74 and 76 are connected to center pole 95 of a three-pole switch 98. Side pole 105 of the switch 98 is connected to the power supply 54 by cable 109 and the side pole 113 of the switch 98 is connected by cable 121 to rotor 116 of a wound rotor motor 118. A relay contact switch 142 is mounted in the path of the three-pole switch such that the relay switch 142 is actuated when the three-pole switch 98 is moved to electrically connect the poles 95 and 113. The relay actuating switch 142 actuates relay $R_1$ to close normally open contactor $C_1$ to connect the power supply 54 to the stater 124 of the wound rotor motor 118 by way of cable 127.

End 130 of the rotor shaft 131 is mounted to innerace 132 of overriding clutch 134 with the outerrace 136 mounted on stationary member 138. The stator 124 is secured against rotation by strut 140 which mounts the stator to the stationary member 138. End 144 of the rotor shaft 131 is connected to a shaft driving motor 146 e.g. a wound rotor motor. The motor 146 is electrically connected to a 60 volt, 3 phase-60 Hertz power supply 150 by normally open switch 154 and cable 152.

The three-pole switch 98 is moved to the first energized position, i.e., electrically connecting poles 95 and 113 to electrically connect the power motors 73, 74 and 76 to the power supply 54 through wound rotor motor 118. The power motors 73, 74 and 76 drive the conveyor drive motors 36, 38 and 40 which in turn drive their respective conveyor rolls 42, 44 and 46 each at a speed or about 600 inches (15 meters) per minute, i.e., at the ribbon speed.

With reference to FIG. 1, the ribbon 26 advances along the rolls 24 e.g. a first position into the scoring station 28 where lateral score 30 is imposed on every 40 inch (1 meter) width of ribbon. The ribbon continues to move into the score opening station 32 where the scores are sequentially opened by lift roll 190. The ribbon as it moves into the score opening station 32, advances under a convenient monitoring device 162 which forwards a signal along line 164 to computer 160 to monitor ribbon displacement. When a sheet is severed from the ribbon and the leading edge of the severed sheet is on the rolls 42 e.g. a second position, a signal is forwarded along cable 165 by the computer 160 to close normally open switch 154. The motor 146 is now connected to the power supply 150 and rotates the rotor 116 of the motor 118 in the direction opposite to the direction imposed by the magnetic field to increase the output of the motor 118. The increased output of the motor 118 accelerates the power motors 73, 74 and 76 which in turn accelerate the conveyor drive motors 36, 38 and 40 to increase the speed of their respective rolls 42, 44 and 46 to displace the severed sheet at a linear speed of about 800 inches (20 meters) per minute. After 0.2 second, the computer forwards a signal along the line 165 to open the closed switch 154 and deenergize the shaft rotating motor 146. The conveyor rolls 42, 44 and 46 decelerate to rotate at the same speed as the rolls 24. Accelerating the rolls 42, 44 and 46 for about 0.2 seconds provides about an inch (2.54 centimeter) spacing between severed sheets and/or leading edge of the ribbon determined as follows. Accelerating the rolls 42, 44 and 46 for 0.2 second gives a spacing of about 0.67 inch (1.78 centimeter). The remainder of the inch (2.54 centimeter) spacing is attained as the rolls 42, 44 and 46 decelerate.

When the next score line is opened, the above is repeated to accelerate the second severed sheet together with the first severed sheet to maintain the spacing between the two sheets. As before, after the time period of 0.2 second the rolls 42, 44 and 46 decelerate to the same speed as the ribbon conveying rolls 24. When the third score line is opened, the computer forwards a signal along wires cables 166, 167 and 168 to close normally open switches 58, 59 and 60 to connect the conveyor drive motors 36, 38 and 40, respectively, to the power supply 65. The conveyor drive motors 36, 38 and 40 drive their respective conveyor rolls, 42, 44 and 46 to convey the group of three spaced sheets at a linear speed of about 2400 inches (60 meters) per minute.

As the trailing edge of the last sheet in the group leaves the last downstream roll 42, the computer 160 forwards a signal along cable 166 to open the switch 58 and along line 169 to close switch 66 to connect the motor 36 to 200 D.C. voltage supply 72 by cable 69. The D.C. voltage decelerates the motor 36 in a controlled manner to rotate the rolls 42 at the ribbon speed to receive the leading edge of the ribbon, i.e., leading edge of the next sheet to be severed. After about ½ second a signal is forwarded along cable 169 to open the closed switch 66. As the trailing edge of the last sheet in the group leaves the last downstream roll of the rolls 44 and of the rolls 46, signals are forward from the computer 160 along the lines 166 and 167 to open the switches 59 and 60, respectively and along lines 170 and 171 to close switches 67 and 68 for about ½ second and then along lines 170 and 171 to open the switches 170 and 171, respectively. The rolls 42, 44 and 46 are now rotating at the same speed as the ribbon conveying rolls 24. The group of spaced sheets are advanced by the conveyor rolls 50 e.g. a third position into work stations (not shown).

As can now be appreciated the above example is presented for illustration purposes only and is not limiting to the invention. For example, the invention may be practiced for spacing and moving groups of more or less than three sheets.

What is claimed is:

1. Apparatus for spacing articles and moving groups of spaced articles, comprising:

conveying means having an upstream section, a downstream section and an intermediate section between said upstream section and said downstream section;

means for advancing individual articles onto said upstream section at a receiving speed;

first motor means to drive said upstream section at the receiving speed, to accelerate said first section from the receiving speed toward a speed greater than the receiving speed defined as a spacing speed, to decelerate said first section to the receiving speed and to accelerate said first section to a discharge speed greater than the receiving speed;

second motor means to drive said intermediate section at the receiving speed, to accelerate said intermediate section to the spacing speed, to decelerate said intermediate section to the receiving speed and to accelerate said intermediate section to the discharge speed;

third motor means to drive said downstream section at the receiving speed, to accelerate said downstream section to the spacing speed, to decelerate said downstream section to the receiving speed and to accelerate said downstream section to the discharge speed;

means responsive to an article advancing onto said upstream section for (1) acting on said first motor means to drive said upstream section at the receiving speed to receive an article from said advancing means, to accelerate said upstream section toward the spacing speed to maintain spacing between articles on said upstream section and provide a spacing between a most recent article moved onto said upstream section and next article to be moved onto said upstream section from said advancing means, and to decelerate said conveying means to the receiving speed to maintain spacing between articles in group being accumulated on said upstream section and receive an article onto said upstream section from said advancing means to increase the number of spaced articles in the group being accumulated and (2) acting on said first motor means to accelerate said upstream section to the discharge speed when the group of spaced articles has been accumulated on said conveying means to advance the group from said upstream section onto said intermediate section and to maintain said upstream section at the discharge speed at least until last article of the group has moved from said upstream section;

said acting means responsive to an article advancing from said upstream section onto said intermediate section to act on said second motor means to drive said intermediate section at the receiving speed, to accelerate said intermediate section toward the spacing speed, and to decelerate said downstream section to the receiving speed in unison with said upstream section when at least one article of the group being accumulated is on said intermediate section and to accelerate said intermediate section to the discharge speed and to maintain said intermediate section at the discharge speed as long as at least one of the articles of the accumulated group of spaced articles is on said intermediate section; and said acting means responsive to an article advancing from said intermediate section onto said downstream section to act on said third motor means to drive said downstream section at the receiving speed, to accelerate said downstream section to the spacing speed and to decelerate said downstream section to the receiving speed in unison with said intermediate section when at least one article of the group being accumulated is on said downstream section and to accelerate said downstream section to the discharge speed and to maintain said downstream section at the discharge speed as long as at least one article of the accumulated group of spaced articles is on said downstream section.

2. The apparatus as set forth in claim 1 wherein said conveying means is a first conveying means and further including second conveying means downstream of said downstream section of said first conveying means and wherein said acting means successively acts on said first motor means, said second motor means, and said third motor means as the last upstream article of an accumulated group of spaced articles successively moves onto said intermediate section, said downstream section and said second conveying means to decelerate said upstream section, said intermediate and said downstream section from the discharge speed to the receiving speed.

3. The apparatus as set forth in claim 2 wherein each of said motor means includes:
conveyor drive motor for driving its respective one of said upstream, intermediate and downstream sections.

4. The apparatus as set forth in claim 3 wherein said conveyor drive motor of each of said motor means includes:
an induction motor;
means for operatively connecting said induction motor to its respective one of said upstream section, said intermediate section or said downstream section;
a synchronous motor; and
interconnecting means to power said induction motor by way of said synchronous motor.

5. The apparatus as set forth in claim 4 wherein said powering means includes:
transformer means connected to each of said induction motors of said first, second and third conveyor drive motors; and wherein
said acting means includes means acting on said transformer means for varying output of said transformer means to selectively accelerate said upstream section, said intermediate section and said downstream section by way of its respective one of said first, second and third conveyor drive motors toward the spacing speed and to selectively decelerate said upstream section, said intermediate section and said downstream section by way of its respective one of said first, second and third conveyor drive motors to the receiving speed.

6. The apparatus as set forth in claim 5 wherein said transformer means includes:
a wound rotor motor having a rotor; and
means acting on said rotor for preventing rotation in a first direction and for permitting rotation in an opposite second direction; and wherein
said varying means includes:
electrical supply means for applying a force on said rotor to urge same in the first direction to provide said wound rotor motor with a first electrical input to output ratio to drive each of said synchronous motors to drive its respective said induction motor to drive its respective section, at the receiving speed; and
means acting on said rotor for rotating same in the second direction such that said wound rotor motor has a second electrical input to output ratio to accelerate each of said synchronous motors to accelerate its respective induction motor to accelerate its respective section toward the spacing speed; and wherein
said acting means selectively acts on said electrical supply means and said rotating means to selectively control the input to output ratio of said rotor to selectively drive said sections at the receiving speed, to selectively accelerate said sections toward the spacing speed and to selectively decelerate said sections to the receiving speed.

7. The apparatus as set forth in claim 6 wherein said powering means includes:
a power source; wherein
each of said conveyor motors includes:
first switch; and
means for electrical connecting each of
said induction motors to said power supply through a respective said first switch; and wherein
said acting means acts on said first switches to interconnect respective ones of said induction motors to said power source to accelerate its respective induction motor to accelerate its respective section to the discharge speed and to disconnect respective ones of said induction motors from said power source to drive its respective induction motor to drive its respective section by way of its respective synchronous motor.

8. The apparatus as set forth in claim 7 wherein said powering means includes:
electrical brake means; wherein
each of said conveyor drive motors include:
a second switch; and
means for electrically connecting said
induction motor to said brake means through said second switch; and wherein
said acting means selectively acts on said first switches and said second switches to close said first switch and open said second switch of a selected induction motor to accelerate and drive said induction motor to accelerate and drive its respective section at the discharge speed; to open said first switch and close said second switch of a selected induction motor to decelerate said induction motor to decelerate its respective section from the discharge speed to the receiving speed; and to open said first and second switches of a selected induction motor to drive said induction motor to drive its respective section at the receiving speed by way of its respective synchronous motor.

9. The apparatus as set forth in claim 8 wherein said advancing means is a third conveying means powered by a motor and further including:
means for connecting said motor to said electrical supply means for driving said third conveying means at approximately the receiving speed.

10. The apparatus as set forth in claim 9 wherein the articles are glass sheets and said second conveying means includes:
means electrically connected to said power source for driving said third conveying means at approximately the discharge speed.

11. The apparatus as set forth in claim 10 wherein said advancing means further includes:
severing means for severing a glass ribbon into the glass sheets.

* * * * *